United States Patent
Zhuang et al.

(10) Patent No.: US 11,232,444 B2
(45) Date of Patent: Jan. 25, 2022

(54) DIGITAL ASSET TRANSACTION METHOD

(71) Applicant: CoolBitX Ltd., Grand Cayman (KY)

(72) Inventors: Jay Zhuang, Taipei (TW); Shih Mai Ou, Taipei (TW)

(73) Assignee: COOLBITX LTD., Grand Cayman (KY)

( * ) Notice: Subject to any disclaimer, the term of this patent is extended or adjusted under 35 U.S.C. 154(b) by 117 days.

(21) Appl. No.: 15/906,834

(22) Filed: Feb. 27, 2018

(65) Prior Publication Data

US 2019/0266606 A1    Aug. 29, 2019

(51) Int. Cl.
    *G06Q 20/32*    (2012.01)
    *G06Q 20/40*    (2012.01)

(52) U.S. Cl.
    CPC ......... *G06Q 20/401* (2013.01); *G06Q 20/325* (2013.01)

(58) Field of Classification Search
    USPC .......................................................... 705/44
    See application file for complete search history.

(56) References Cited

U.S. PATENT DOCUMENTS

| | | | | |
|---|---|---|---|---|
| 8,408,463 B2 * | 4/2013 | Narendra | ............. | G06Q 20/353 |
| | | | | 235/451 |
| 8,905,303 B1 * | 12/2014 | Ben Ayed | ............. | G06Q 20/32 |
| | | | | 235/380 |
| 9,516,010 B1 * | 12/2016 | Avital | ................... | H04L 63/083 |
| 9,892,403 B2 * | 2/2018 | Fontaine | ............... | G06Q 20/353 |
| 2005/0250538 A1 * | 11/2005 | Narasimhan | .......... | G07F 7/0886 |
| | | | | 455/558 |
| 2009/0198618 A1 * | 8/2009 | Chan | ...................... | G06Q 20/02 |
| | | | | 705/66 |
| 2013/0268443 A1 * | 10/2013 | Petrov | ................... | H04L 9/3234 |
| | | | | 705/64 |
| 2017/0178090 A1 * | 6/2017 | Sarin | .................. | G06Q 20/3224 |

FOREIGN PATENT DOCUMENTS

| WO | WO-2007076476 A2 * | 7/2007 | .......... | G07F 7/1008 |
|---|---|---|---|---|
| WO | WO-2016168409 A1 * | 10/2016 | ............. | H04W 4/80 |

* cited by examiner

*Primary Examiner* — Narayanswamy Subramanian
*Assistant Examiner* — Paul S Schwarzenberg
(74) *Attorney, Agent, or Firm* — Rabin & Berdo, P.C.

(57) ABSTRACT

A digital asset transaction method is implemented using a connected device connectable to the Internet and a closed device not connectable to the Internet and includes the following steps: the connected device displays a first check message according to a transaction data input thereto by a user; the connected device transmits the transaction data to the closed device after the user confirms the first check message matches the transaction data; the closed device displays a second check message according to the transaction data transmitted thereto by the connected device; the closed device transmits an authentication data to the connected device after the user confirms the second check message matches the transaction data; and the connected device executes the digital asset transaction after receiving the authentication data from the closed device. With the above method, the user can verify transaction content on different devices and decide whether to execute the transaction.

6 Claims, 4 Drawing Sheets

DIGITAL ASSET TRANSACTION METHOD

FIELD OF THE INVENTION

The present invention relates to a digital asset transaction method, and more particularly, to a digital asset transaction method that includes multiple times of verification of the exact content of a digital asset transaction on different devices during the process of transaction.

BACKGROUND OF THE INVENTION

Due to the technological development, the conventional ways of making transactions by exchanging physical currencies, asset certificates or other assets face to face have gradually replaced by digital transactions, which can be effected at two distant locations by exchanging digital assets without the need for the transaction participants to meet one another and pay cash. However, unfortunately, new ways of cyber crime also emerge with the constant technological development to endanger the safety of digital transactions via the Internet.

To illegally get a victim's asset in the process of a digital asset transaction, a malicious person will possibly try to directly implant a pirating program in a transaction system via the Internet or utilize some flaws of the transaction program or the electronic device for performing the transaction to obtain a user's transaction authority and use the same to perform the transaction as a camouflaged user. Even if the malicious person failed to illegally obtain the user's transaction authority, he may still fake the operating page or screen of the electronic device used by the user to perform the transaction or change the amount of transacted asset or the counterparty in the transaction. As a result, the real user might possibly authorize the transfer of his own asset to an actually unknown third party without being aware of his losses.

Therefore, it is desirable to develop a new digital asset transaction method that provides improved ways of verification and authentication to effectively prevent the content of transactions or the interfaces used in the transactions from being tampered during the process of transactions, so as to secure the safety of dealers' personal assets.

SUMMARY OF THE INVENTION

A primary object of the present invention is to provide a digital asset transaction method, according to which the exact content of a digital asset transaction performed via a network can be verified not only on a first electronic device, but also on a second electronic device that is different from the first electronic device. By verifying the content of the transaction twice on different electronic devices, it is able to prevent the possibility that all the electronic devices used in the transaction are illegally tampered by a malicious person to change the content of the transaction.

Another object of the present invention is to provide a digital asset transaction method, according to which a digital asset transaction is performed via a plurality of electronic devices and the content of transaction is verified multiple times on these electronic devices, and some of the electronic devices used in the transaction have differently restricted Internet connection capability to thereby prevent easy tampering of all the electronic devices by malicious persons during the process of transaction simply by connecting to the electronic devices via the Internet.

To achieve the above and other objects, the digital asset transaction method according to the present invention is implemented via a connected device, which is directly connectable to the Internet, and a closed device, which is connectable to the connected device but not directly connectable to the Internet and is able to provide an authentication data for permitting the connected device to perform a digital asset transaction. The digital asset transaction method includes:

a "displaying first check message" step, in which the connected device displays a first check message according to a transaction data input thereto by a user for transacting a digital asset;

a "transmitting transaction data" step, in which the connected device transmits the transaction data to the closed device when the connected device receives a first confirmation instruction input thereto by the user for indicating the first check message and the transaction data match each other;

a "displaying second check message" step, in which the closed device displays a second check message according to the transaction data received from the connected device;

a "transmitting authentication data" step, in which the closed device transmits an authentication data to the connected device when the closed device receives a second confirmation instruction input thereto by the user for indicating the second check message and the transaction data match each other; and an "executing transaction" step, in which the connected device executes the digital asset transaction according to the transaction data when the connected device receives the authentication data from the closed device.

With respect to the hardware design of the closed device, according to an operable embodiment, it includes a security element (SE) for providing the authentication data and a microcontroller unit (MCU) for determining whether or not the connected device is permitted to connect to the security element as well as for generating the second check message.

According to a preferred embodiment, the authentication data is at least one of a private key and a digital signature to be used in the digital asset transaction; the digital asset is at least one of an e-money and an electronic authorization; and the transaction data includes the type of the digital asset to be transacted, the transaction amount and the counterparty in the digital asset transaction.

To prevent the closed device from being arbitrarily connected to any connected device via the Internet, the method according to an operable embodiment of the present invention can further include an "authentication" step after the "transmitting transaction data" step and before the "displaying second check message" step. In the "authentication" step, the closed device receives and authenticates a device pairing data generated by the connected device to indicate a pairing between the closed device and the connected device.

According to a preferred embodiment of the present invention, the method further includes a post-process step after the user inputs the second confirmation instruction. In the post-process step, the closed device generates and transmits a second digital signature to the connected device to serve as the authentication data for completing the transaction.

The method of present invention also includes steps to stop the transaction. According to an operable embodiment, the digital asset transaction method can further include a "cancellation" step after the "displaying second check message" step. In the "cancellation" step, the digital asset transaction stops when the closed device does not transmit an authentication data to the connected device after the lapse of a preset time period.

Alternatively, according to another operable embodiment, the digital asset transaction method can further include a "cancellation" step after the "displaying second check message" step. In the "cancellation" step, the user inputs on the connected device a stop instruction to stop the digital asset transaction, and accordingly, the connected device transmits a "stop" message to the closed device to stop the digital asset transaction.

In summary, the digital asset transaction method according to the present invention is characterized in that at least two different electronic devices are used in the process of the digital asset transaction to verify the exact content of the transaction twice, and that the multiple checks largely reduce the possibility that the transaction data or the counterparty in the transaction is illegally changed by malicious persons during the process of the transaction. And, to further protect the content of the transaction against tampering, one of the electronic devices used to perform the transaction is a connected device directly connectable to the Internet and the other one of the electronic devices is a closed device with restricted Internet connection capability and not directly connectable to the Internet. Further, in the process of the transaction, while the closed device determines whether the connected device is permitted to connect thereto by examining a first digital signature generated by the connected device, the user must also manually input confirmation instructions to confirm the content of the transaction multiple times, or else the transaction will be considered as failed and automatically stop. With these arrangements, it is able to secure the safety of the user's digital asset.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with a preferred embodiment thereof and by referring to the accompanying drawings.

Figure 1:
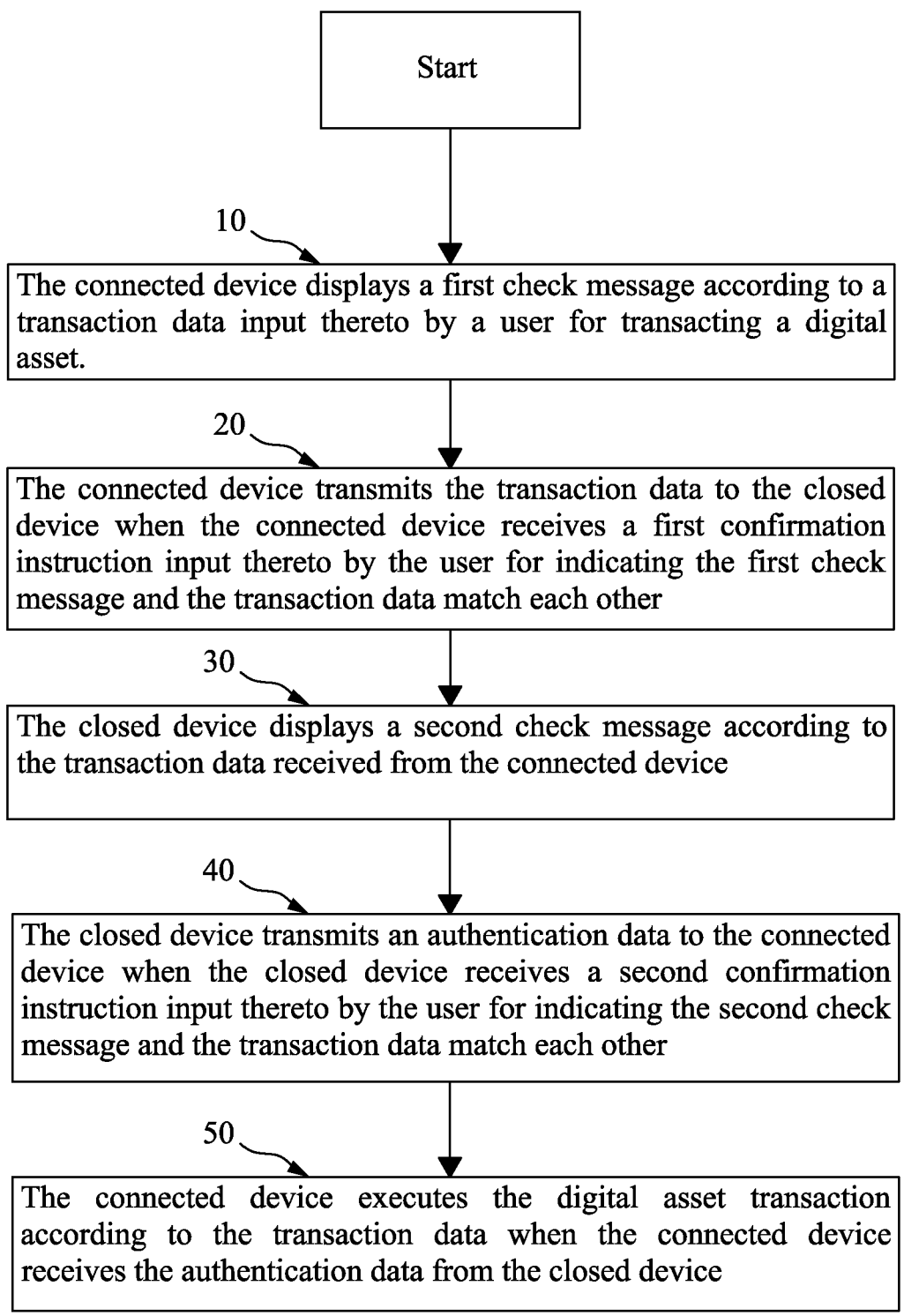
FIG. 1 is a general flowchart showing the steps included in a digital asset transaction method according to the present invention.
Figure 2:
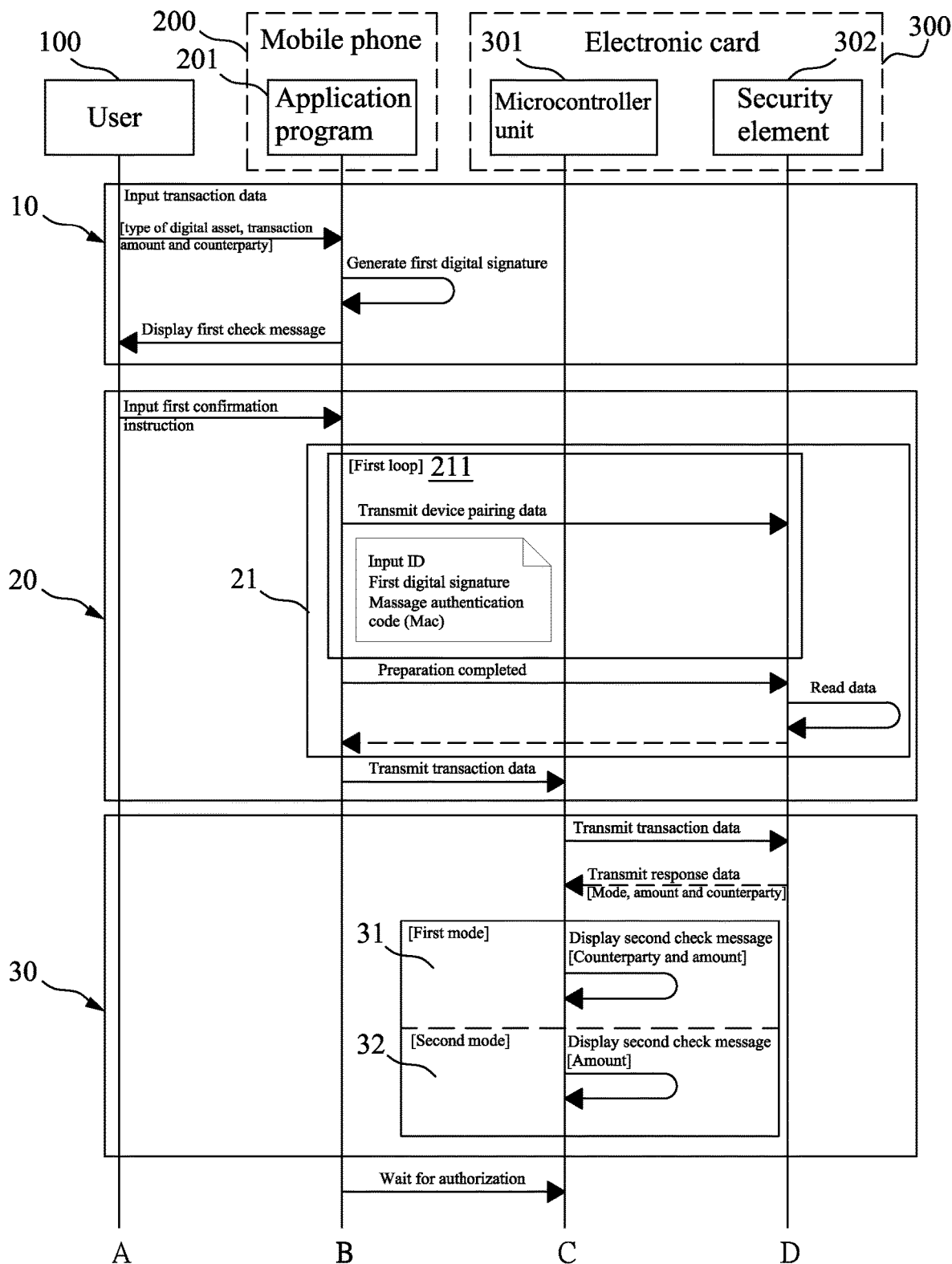
FIGS. 2, 3 and 4 are detailed flowcharts showing the steps included in a preferred embodiment of the digital asset transaction method according to the present invention.
Figure 3:
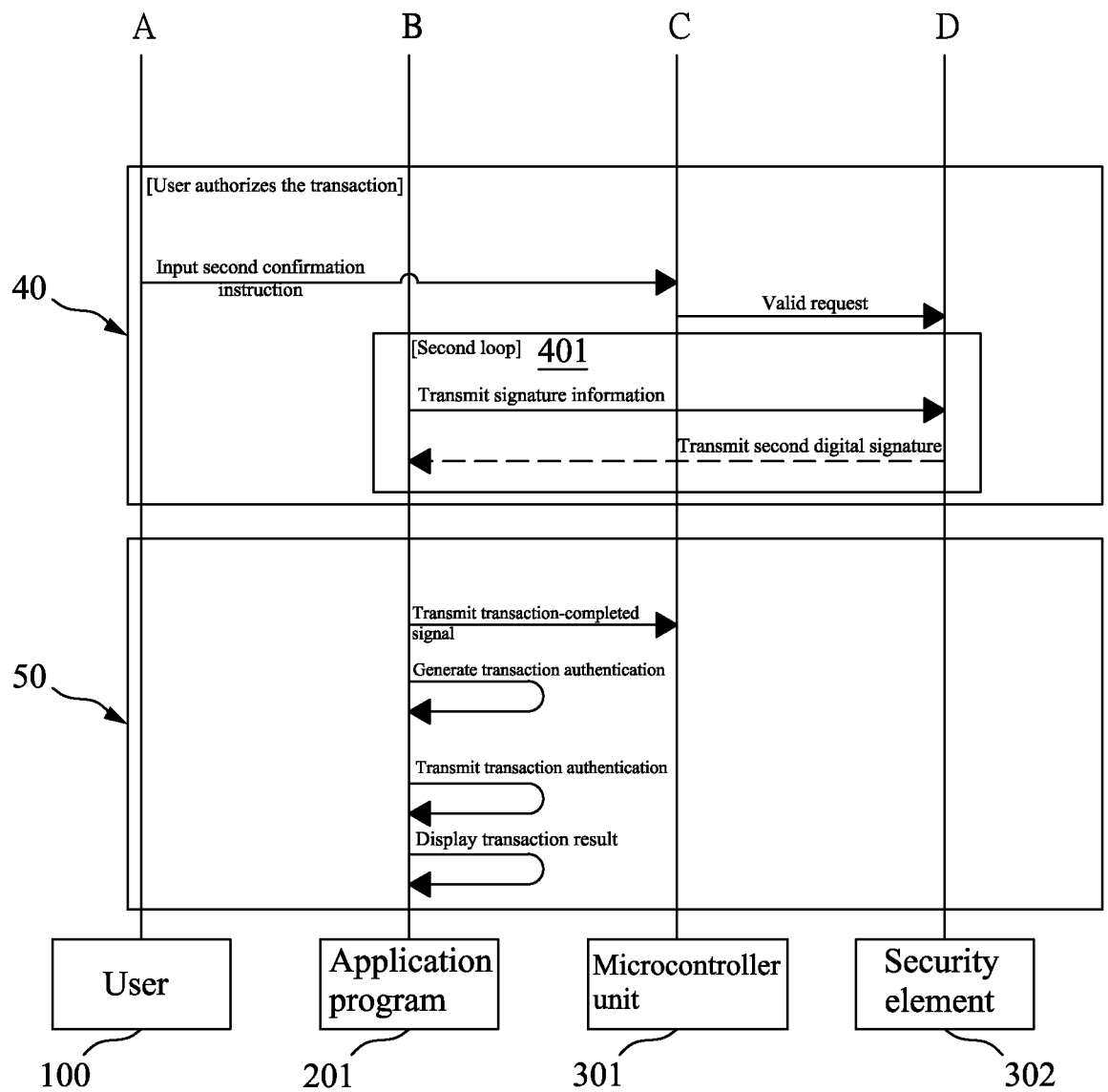
Figure 4:
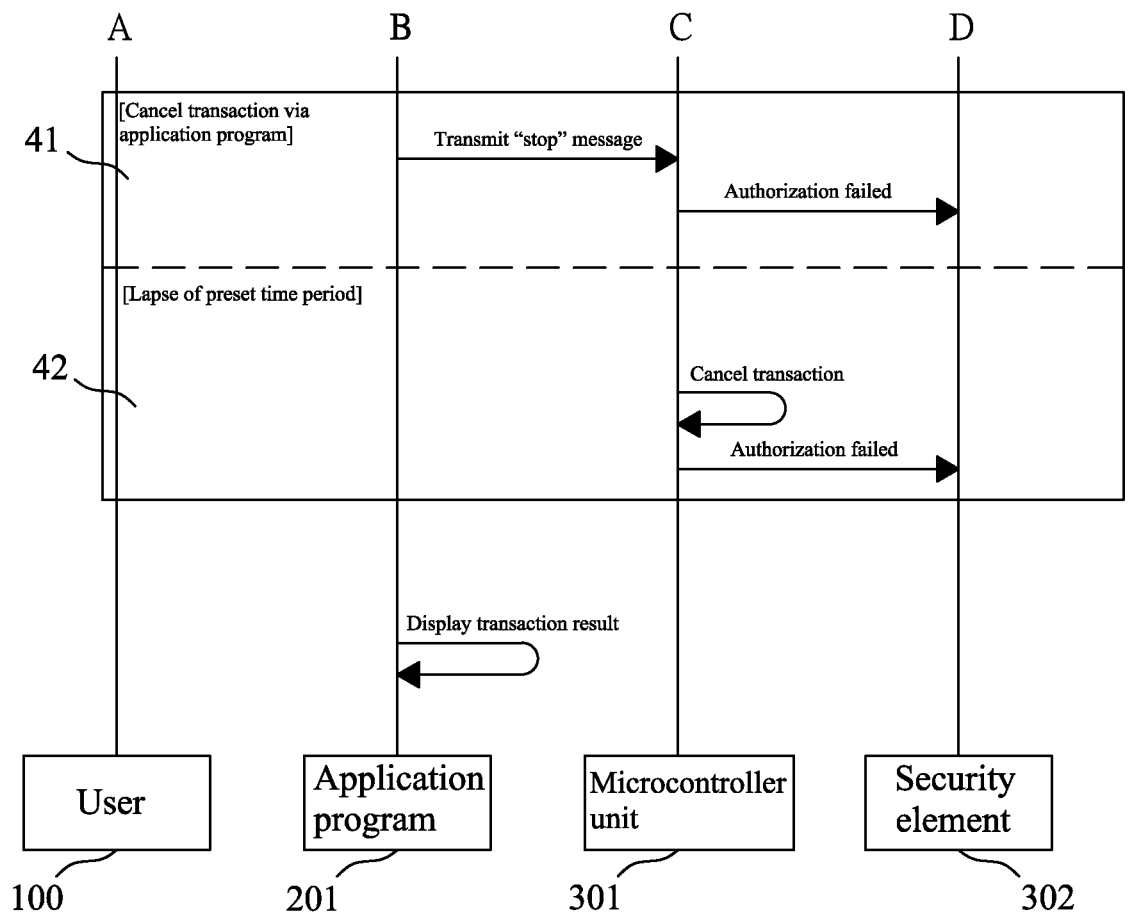

Please refer to FIG. 1 that is a general flowchart showing the steps included in a digital asset transaction method according to the present invention; and to FIGS. 2, 3 and 4 that are detailed flowcharts showing the steps included in a preferred embodiment of the digital asset transaction method according to the present invention. The digital asset transaction method of the present invention is designed for use with a connected device, which can be directly connected to the Internet, and a closed device, which is connectable to the connected device but not directly connectable to the Internet. The following is a description of the steps included in the general flowchart shown in FIG. 1.

In a "Displaying first check message" step 10, the connected device displays a first check message according to a transaction data input thereto by a user for transacting a digital asset.

In a "Transmitting transaction data" step 20, the connected device transmits the transaction data to the closed device when the connected device receives a first confirmation instruction input thereto by the user for indicating the first check message and the transaction data match each other.

In a "Displaying second check message" step 30, the closed device displays a second check message according to the transaction data received from the connected device.

In a "Transmitting authentication data" step 40, the closed device transmits an authentication data to the connected device when the closed device receives a second confirmation instruction input thereto by the user for indicating the second check message and the transaction data match each other.

In an "Executing transaction" step 50, the connected device executes the digital asset transaction according to the transaction data when the connected device receives the authentication data from the closed device.

The following is a description of the steps included in the detailed flowchart shown in FIGS. 2 and 3. In the preferred embodiment of the digital asset transaction method according to the present invention, the connected device is a mobile phone 200 and the closed device is an electronic card 300.

According to the present invention, there is not any particular limit to the hardware type of the connected device and the closed device and to the actual content of the digital asset to be transacted. Therefore, in other embodiments, the connected device can be a computer or a smart wearable device already known in the market; and the closed device can be a computer or a wearable device with restricted Internet connection capability. That is, according to the present invention, the electronic card 300 can be any type, so long as it has only restricted Internet connection capability.

In the preferred embodiment, the electronic card 300 serving as the closed device includes a microcontroller unit (MCU) 301, a security element (SE) 302, a display (not shown) for displaying the second check message, and an input device (not shown) for the user to input the second confirmation instruction. The security element 302 can provide more than one type of authentication data required in the digital asset transaction.

In different embodiments of the present invention, the digital asset can be different types of e-money or other electronic authorization needed in asset transactions. Similarly, in different embodiments of the present invention, the authentication data can be the digital asset itself that is similar to a real currency, or can be at least one of a private key and a digital signature that will be used in making the digital asset transaction. To enable convenient explanation, in the preferred embodiment of the present invention, the security element 302 has a private key stored thereon for use in an e-money transaction, and the authentication data is a digital signature generated by the private key for use in the e-money transaction. More details will be given later.

The microcontroller unit 301 is connected to the security element 302 for determining whether or not the connected device connected to the electronic card 300 has the authority to access the data stored on the security element 302, and any connected device that is not paired with the electronic card 300 is not permitted to access the data stored on the security element 302 to ensure the safety of using the electronic card 300. More details will be given later about how the microcontroller unit 301 determines whether or not the mobile phone 200 has the authority to access the data on the security element 302.

Returning to the digital asset transaction method according to the present invention. Please refer to FIGS. 2 and 3 for a detailed description of the steps included in the method. In the "displaying first check message" step 10, a user 100 operates the mobile phone 200 to enable an application program 201 and then, inputs a transaction data for making a desired digital asset transaction. Herein, the digital asset is an amount of e-money. At this point, the application program 201 generates a first digital signature for use by the electronic card 300 later in comparing and verifying the content of the transaction. Meanwhile, a first check message is displayed on the mobile phone 200 to complete the "displaying first check message" step 10.

As having been mentioned above, in addition to the e-money, the electronic card 300 can also have data of other different digital assets stored thereon. To ensure the type of digital asset to be transacted, the transaction data includes the type of digital asset to be transacted, which is e-money in the preferred embodiment of the present invention; the transaction amount; and the counterparty in the transaction. According to the preferred embodiment of the present invention, the counterparty is the counterparty's account address.

In the "transmitting transaction data" step 20, when the user 100 has verified the first check message is consistent with the transaction data input by him/her, the user 100 further inputs a first confirmation instruction on the mobile phone 200, so that the transaction data is transmitted from the mobile phone 200 to the electronic card 300.

According to the preferred embodiment of the present invention, the digital asset transaction method can further include an "authentication" step 21 before the "displaying second check message" step 30 for authenticating the application program 201 is permitted to access the data stored on the security element 302 of the electronic card 300.

More specifically, in the "authentication" step 21, the application program 201 transmits a device pairing data to the electronic card 300. The device pairing data includes an input ID representing the mobile phone 200, the first digital signature, a message authentication code (Mac), and other related data similarly used to authenticate the electronic card 300 can be connected to the mobile phone 200. On receipt of the device pairing data, the microcontroller unit 301 checks the content of all data items in the device pairing data to determine it is safe to transmit the device pairing data to the security element 302. When the microcontroller unit 301 confirms all the data items are correct, the "authentication" step 21 is completed.

Since it is possible a plurality of different first digital signatures might be needed in the transaction of the e-money, the digital asset transaction method of the present invention is so designed that the application program 201 can transmit the device pairing data multiple times via a first loop 211.

For the electronic card 300 and the application program 201 on the mobile phone 200 to identify each other, a pairing is set up between them before implementing the digital asset transaction method of the present invention, so as to generate the message authentication code and other data to be similarly used in the "authentication" step 21 to determine whether the electronic card 300 can be connected to the mobile phone 200. Wherein, there is not any particular limit to the way of setting up the pairing between the devices 200, 300; and any conventional way of pairing different devices can be used for the purpose of the present invention.

Further, according to the present invention, the "authentication" step 21 is not a prerequisite step. In some other embodiments of the present invention, the electronic card 300 can still be connected to the mobile phone 200 even if the electronic card 300 has not been paired with the application program 201 on the mobile phone 200. However, for the purpose of security, in these embodiments, some other ways of authentication that do not use the aforesaid device pairing data can still be used between the mobile phone 200 and the electronic card 300. For example, a code for the electronic card 300 to verify can be included in the transaction data or the first confirmation instruction; or a code can be input via the input device on the electronic card 300 corresponding to a code generated by the mobile phone 200.

The "displaying second check massage" step 30 starts after completion of the "authentication" step 21. In the "displaying second check massage" step 30, when the microcontroller unit 301 receives the transaction data from the mobile phone 200, it further transmits the transaction data to the security element 302 and read a response data from the security element 302. Then, a second check message is displayed on the display device of the electronic card 300 according to the response data to complete the "display second check message" step 30.

In the preferred embodiment, the response data includes the transaction amount and the counterparty's address, as well as a mode data used to determine the degree of detail of the message to be displayed on the display device. In the case the mode data indicates a first mode 31, the second check message shown on the display device of the electronic card 300 includes the transaction amount and the counterparty in the transaction. Alternatively, in a second mode 32, only the transaction amount is shown on the display device to serve as the second check message.

Of course, in other operable embodiment, the mode data can be changed according to actual need in use to include, for example, a third mode, in which other information related to the transaction, such as the type of the digital asset to be transacted, can also be shown on the display device.

Then, in the "transmitting authentication data" step 40, when the user 100 has verified the second check message is consistent with the transaction data input by him/her, the user 100 further inputs a second confirmation instruction on the input device of the electronic card 300; and when the microcontroller unit 301 receives the second confirmation instruction, the microcontroller unit 301 transmits a valid request to the security element 302.

Thereafter, the application program 201 will transmit at least one piece of signature information to the security element 302, and the security element 302 will in turn transmit a second digital signature generated by the private key to serve as an authentication data. Just like the condition in the previous "authentication" step 21, since it is possible a plurality of different second digital signatures might be needed in the transaction, the application program 201 can transmit the signature information multiple times via a second loop 401 for receiving the second digital signatures.

After receiving the second digital signature, the application program 201 transmits a transaction-completed signal to the microcontroller unit 301 to inform the electronic card 300 the transaction has completed. Meanwhile, the application program 201 generates a transaction authentication that includes the second digital signature and transmits the transaction authentication via the Internet to the e-money transaction system to complete all the transaction procedures; and a detailed data showing the transaction result is also shown on the application program 201.

In conclusion, with the digital asset transaction method provided by the present invention, the content of the digital asset that is exactly transacted can be verified multiple times via different devices during the process of the transaction, and therefore, it is able to prevent the risk of having a tampered device when there is only one electronic device being used in performing the transaction. Further, since the closed device is used in addition to the connected device during the transaction process for further verification of the transaction, and since the closed device is isolated from the Internet when it is not used to perform a transaction, it is able to further prevent the possibility that the closed device is illegally tampered.

According to the preferred embodiment of the present invention, if anyone tries to access the closed device, the closed device will further examine the person who is trying to access it. Therefore, not any application program 201 can access the data stored on the closed device. Even if some malicious person tries to fake the application program 201 that is used in the transaction process, the person still can not pass the authentication step that requires the first digital signature generated by the real application program 201 and included in the device pairing data transmitted by the application program 201 to the electronic card 300. Therefore, the safety of the digital asset is further protected against theft.

Please refer to FIG. 4 about how to stop the digital asset transaction. According to the preferred embodiment of the present invention, a "first cancellation" step 41 can be performed after the "displaying second check message" step 30. In the "first cancellation" step 41, the user 100 can use the mobile phone 200 to operate the application program 201 to transmit a "stop" message to the electronic card 300, so that the microcontroller unit 301 transmits an "authorization failed" message to the security element 302 to stop the transaction of the digital asset. According to the present invention, there is not any limit to the person who can operate the mobile phone for the microcontroller unit 301 to transmit the "authorization failed" message.

Alternatively, according to the preferred embodiment of the present invention, another "second cancellation" step 42 can be performed after the "displaying second check message" step 30. In the "second cancellation" step 42, when the user 100 does not input the second confirmation instruction and the electronic card 300 does not transmit the authentication data after the lapse of a preset time period, the microcontroller unit 301 will transmit an "authorization failed" message to the security element 302 to stop the transaction of the digital asset.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A digital asset transaction method implemented via a connected device, which is directly connectable to the Internet, and a closed device, which is indirectly connectable to the Internet by connecting to the connected device and is able to provide authentication data for permitting the connected device to perform a digital asset transaction, the method comprising:

a "displaying first check message" step, in which transaction data is generated by the connected device for transacting a desired digital asset, and a first check message with the transaction data is generated by the connected device, and then the first check message is displayed by the connected device;

a "transmitting transaction data" step, in which a first confirmation instruction is generated by the connected device when the transaction data of the first check message and the desired digital asset match each other, and then the transaction data is transmitted to the closed device from the connected device based on the first confirmation instruction;

a "displaying second check message" step, in which a second check message with the transaction data is generated by the closed device after receiving the transaction data from the connected device, and then the second check message is displayed by the closed device; and a "transmitting authentication data" step, in which a second confirmation instruction is generated by the closed device when the transaction data of the second check message and the desired digital asset match each other, and then authentication data, including a second digital signature, is generated by the closed device and is transmitted to the connected device from the closed device based on the second confirmation instruction; and an "executing transaction" step, in which a transaction authentication is generated by the connected device for executing transaction of the desired digital asset after receiving the second digital signature of the authentication data, and the transaction authentication and the transaction data is transmitted to the transaction system from the connected device for transacting the desired digital asset;

wherein the closed device includes a security element (SE), the authentication data is stored in the security element, the connected device is permitted to connect to the SE through the MCU, and the second check message is generated by the MCU; and wherein the second check message is displayed by the closed device after receiving, from the connected device, device pairing data that indicates a pairing between the closed device and the connected device.

2. The digital asset transaction method as claimed in claim 1, wherein the digital asset is at least one of an e-money and an electronic authorization.

3. The digital asset transaction method as claimed in claim 1, wherein the transaction data includes a type of the digital asset to be transacted, a transaction amount, and a counterparty in the digital asset transaction.

4. The digital asset transaction method as claimed in claim 1, wherein the transaction authentication is cancelled, to prevent a transmission to the connected device from the closed device, based on the second check message being displayed for a preset time period without generating the second confirmation instruction.

5. The digital asset transaction method as claimed in claim 1, further comprising generating, by the connected device, a stop message after the closed device displays the second check message, and the stop message is transmitted to the closed device to stop the digital asset transaction.

6. The digital asset transaction method as claimed in claim 1, wherein the authentication data is at least one of a private key and a digital signature to be used in the digital asset transaction.

* * * * *